United States Patent [19]
Greutert et al.

[11] Patent Number: 4,476,776
[45] Date of Patent: Oct. 16, 1984

[54] CENTRIFUGE CAGE FOR A COFFEE CENTRIFUGE

[75] Inventors: Albert Greutert, Sachseln; Ruedy Gasser, Lucerne, both of Switzerland

[73] Assignee: Maxs AG, Sachseln, Switzerland

[21] Appl. No.: 391,820

[22] Filed: Jun. 24, 1982

[30] Foreign Application Priority Data

Jul. 6, 1981 [DE] Fed. Rep. of Germany ....... 3126630

[51] Int. Cl.³ .................................................. A47J 31/22
[52] U.S. Cl. ............................. 99/302 C; 99/511; 210/377
[58] Field of Search ............... 99/300, 287, 302 C, 99/511, 508, 512, 513, 510; 210/377, 378; 494/36, 48

[56] References Cited

U.S. PATENT DOCUMENTS

| | | | |
|---|---|---|---|
| 66,241 | 7/1867 | Macumber | 210/377 |
| 750,080 | 1/1904 | Berrigan | 210/377 |
| 1,585,393 | 5/1926 | Laughlin | 494/48 |
| 1,642,662 | 9/1927 | Behr | 210/378 |
| 2,153,581 | 4/1939 | Millar | 210/377 |
| 2,435,665 | 2/1948 | Woolauer | 210/377 |
| 2,631,522 | 3/1953 | Joy | 99/300 |
| 2,845,971 | 8/1958 | Cordero | 99/512 |
| 4,078,481 | 3/1978 | Wunderlin | 99/511 |
| 4,191,325 | 3/1980 | Stroucken | 494/48 |

*Primary Examiner*—Robert W. Jenkins
*Attorney, Agent, or Firm*—Townsend & Townsend

[57] ABSTRACT

A centrifuge cage for coffee centrifuges or juice extractors is in two parts. The top part or member can be moved axially relatively to the bottom part between a closed position, in which the centrifuge cage is sealing tight along the boundary zone on its periphery, the same having a mesh zone, and an open position, in which the filtered material can be hurled outwards from the centrifuge cage.

17 Claims, 5 Drawing Figures

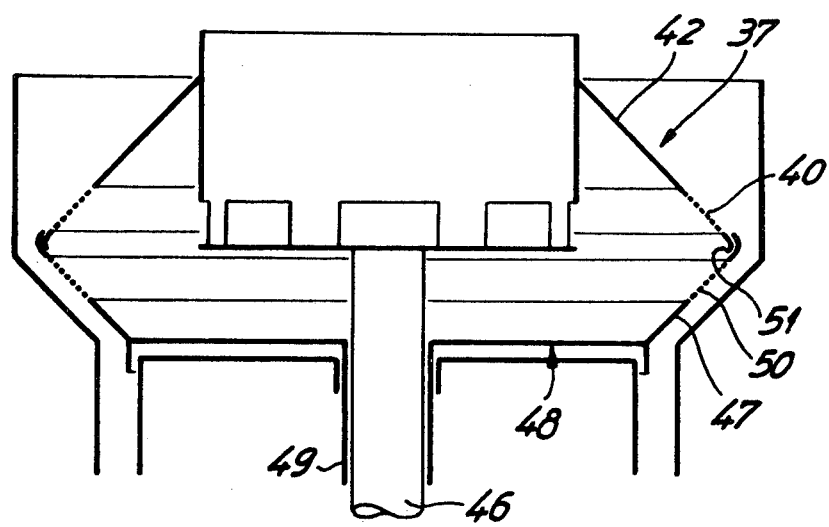
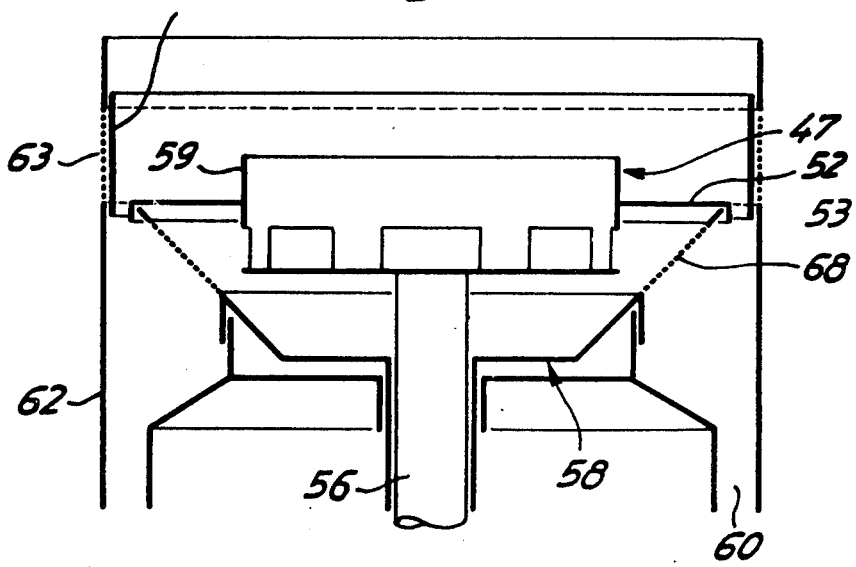

CENTRIFUGE CAGE FOR A COFFEE CENTRIFUGE

BACKGROUND OF THE INVENTION

The invention relates to a centrifuge cage, more particularly for a coffee centrifuge.

Coffee filters for long-term use are known wherein coffee in powder form is introduced into a filter cage formed with minuscule perforations, boiling water then being poured over the powder so that the coffee drops by gravity into a vessel below. Because of their relatively lengthy filtration time, coffee filters of this kind are unsatisfactory for commercial use.

Endeavours have been made to increase the filtration time by using a centrifuge cage as filter cage, so that the liquor and the filtrate are acted on not by gravity alone but by a centrifugal force which is several times stronger than gravity.

BRIEF SUMMARY OF THE INVENTION

It is an object of the invention so to develop a centrifuge cage of the kind outlined that the cycle time for batchwise operation is reduced.

The invention accordingly provides: a rotatable bottom member; a top member which is releasably connected thereto and is movable relatively thereto axially to bound a gap between itself and the top member; at least one mesh zone secured to at least one of said members in a radially outer zone of the periphery; and at least one distributor disc which corotates with the centrifuge cage and is disposed in the plane of the mesh zone. A centrifuge cage of this kind does not reduce the actual filtering time, but it does reduce the time needed to clean the coffee grounds or the like from the centrifuge cage.

Advantageously, the top member comprises a vessel which is open at the top and whose base takes the form of a distributor disc and which is formed with apertures in its periphery near the base. The vessel which is open at the top serves to receive the material which it is required to filter or extract and, if necessary, for pouring in the extraction liquid.

Preferably, the peripheral apertures are contiguous with the distributor disc and the same has radial ribs. Consequently, the material introduced is rotated rapidly and hurled outwards through the peripheral apertures towards the mesh zone.

As an alternative for a juice extractor, the distributor disc can have a rasp surface and a stationary filling tunnel can extend to near such surface.

In the case of a centrifuge cage having a casing around it, the same is formed with closable apertures, preferably at places disposed in a zone determined by the gap-bounding diametric planes. In this event, an axially movable ring which engages with the apertures on the inside can be provided as means for closing the same. Opening the apertures opens up a route via which the extracted material can be emptied.

In accordance with a feature of the invention, the bottom member of the centrifuge cage is disposed on a drive shaft.

In accordance with another feature, the drive shaft is a hollow shaft and the top member is disposed on a shaft which is guided slidingly in the hollow shaft.

Preferably, the gap-bounding junction zone between the bottom member and the top member is disposed near the largest diameter of such members. A radially inwardly disposed sealing lip can be provided near the junction zone and can be disposed on one of the members of the cage.

Preferably, the mesh zones are formed in accordance with a cone generated surface. The extracted material can then be centrifuged out through the gap.

BRIEF DESCRIPTION OF THE DRAWINGS

The invention will be described in greater detail hereinafter with reference to a number of embodiments shown in diagrammatic drawings wherein:

FIG. 3 shows another embodiment of a centrifuge cage;

FIG. 4 shows a third embodiment of a centrifuge cage, and

DETAILED DESCRIPTION OF THE PREFERRED EMBODIMENTS

Figure 1:
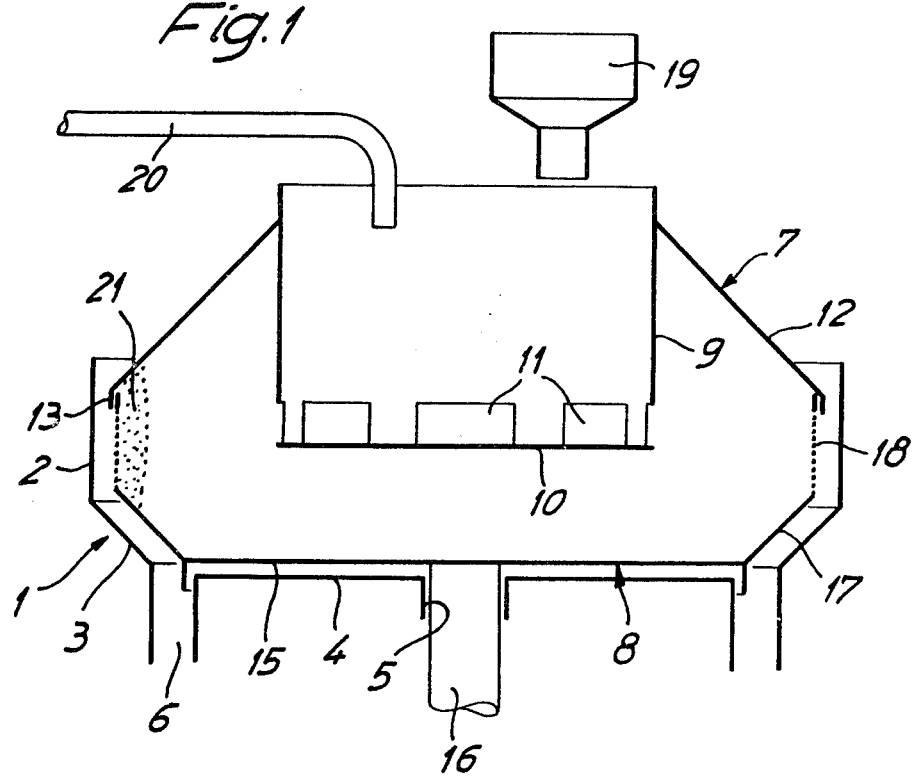
FIG. 1 is an axial section through a coffee centrifuge.

The view in axial section in FIG. 1 shows the main elements of a coffee centrifuge. The same comprises a casing 1 having a cylindrical outer collecting wall 2 merging downwardly into a frustum-shaped region 3, and a base 4, the same being formed with a central aperture 5 and, at its adge, with an outlet 6.

A two-element centrifuge cage comprising a top member 7 and a bottom member 8 is disposed in casing 1.

Top member 7 comprises a dished vessel 9 which is open at the top and whose wall is formed near the base—which takes the form of a distributor disc 10—with peripheral apertures 11. Vessel 9 is connected at the top to a frustum-shaped hood 12 which merges in its bottom peripheral region into a substantially cylindrical sealing flange 13.

Figure 2:
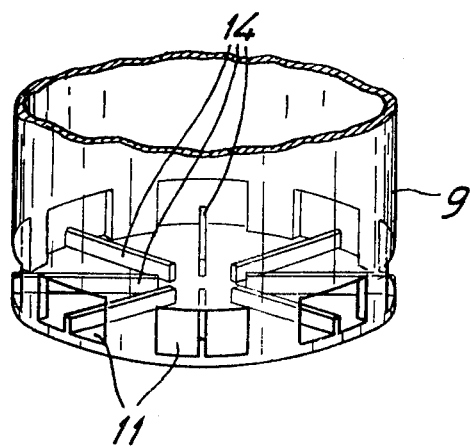
FIG. 2 is a perspective X-ray view of the top member of the centrifuge cage.

As can be gathered from FIG. 2, a number of radially extending ribs 14 each extending to an associated orifice 11 are disposed on base 10 of vessel 9.

The bottom member 8 has a plane circular base 15 which is secured to a drive shaft 16 and merges at its periphery into a frustum-shaped zone 17 from whose free end an upwardly extending mesh mantle 18 projects. With the coffee filter in the operative state shown in FIG. 1, sealing flange 13 engages clampingly over the exposed edge of mesh mantle 18, thus ensuring sealing tightness at this gap-bounding junction zone. A coffee supply receptacle 19 and a hot water feed tube 20 are provided for gravity feeding above the vessel 9.

To operate the centrifuge, the cage is first set in motion, whereafter a predetermined quantity of coffee in powder form is released from the receptacle 19, the coffee in powder form dropping into the vessel 9 and on to the distributor disc 10 to be hurled by centrifugal force through the apertures 11 on to the mesh mantle 18. Boiling water is then introduced through pipe 20 into vessel 9, is also centrifuged radially outwards and impinges on the layer of coffee powder which has formed on the mesh mantle. The boiling water is forced through the coffee powder layer 21 by centrifugal force, extracts the coffee and reaches the outside of the mantle 18, impinges on wall 2, and then discharges through outlet 6.

To clean the centrifuge upon the termination of filtering, the top member is raised a little either manually or by a mechanism (not shown), whereafter the coffee grounds are washed out, for instance, manually.

FIG. 3 is an axial section through a variant wherein the top member 37 is disposed on a shaft 46 and a frustum-shaped hood 42 merges by way of its radially outer peripheral region into a mesh member 40. Bottom member 48 is connected to a hollow shaft 49 and an inclined zone 47 merges into a mesh part 50. The radially outer ends of the parts 40, 50 abut one another and are given a sealing connection at their junction in known manner, for instance, by a lipped seal 51 secured to the edge of the part 40. The other items are as for the embodiment shown in FIG. 1.

Operation is similar, except that to eject the used coffee grounds the shaft 46 is raised so that the two mesh parts 40, 50 disengage from one another and, while the centrifuge cage continues to run in the open position, the coffee grounds can, thanks to the conical shape of the mesh parts, disengage by centrifugal force without any need for washing water and passed through a gap formed between the radial outer ends of parts 40 and 50. Of course, washing water can be introduced additionally into the dished vessel.

FIG. 4 is an axial section through another embodiment wherein the top member 47 comprises not the frustum-shaped hood of the coffee centrifuge of FIG. 1 but a disc 52 which is disposed in one diametric plane and whose edge merges into a sealing flange 53 in shape resembling a cylindrical mantle.

A dished vessel 59 is disposed on a shaft 56 mounted for axial movement.

A bottom member 58 is similar to the bottom member 48 of the cage of FIG. 3 and comprises a frustum-shaped mesh mantle 68 whose outer edge is surrounded sealingly, with the cage in its operative position, by the flange 53.

The operation of this coffee centrifuge differs from that of the previous embodiments only so far as cleaning is concerned. Wall 62 of the vessel around the centrifuge cage is formed with apertures 63 at a place axially above the mesh zone 68. In the operative position—i.e., for filtering the material for extraction—the apertures 63 are closed by a ring 69 engaging with the inside of wall 62, so that the filtrate cannot pass through the apertures 63 and drips down through outlet 60.

To clean out the used coffee grounds from the cage, the top member 47 is raised by the shaft 56 being raised so that a gap arises between the top member 47 and the bottom member 58.

Also, the closure ring 69 is raised, for instance, by projections on the edge of the disc 52, to open the apertures 63. The cage is now set in motion so that the used coffee grounds slide upwardly along the mesh zone 68 and are hurled outwards through the apertures 63. Of course, the same must pass all the coffee grounds, to ensure complete separation of the used coffee grounds and the filtrate.

Figure 5:
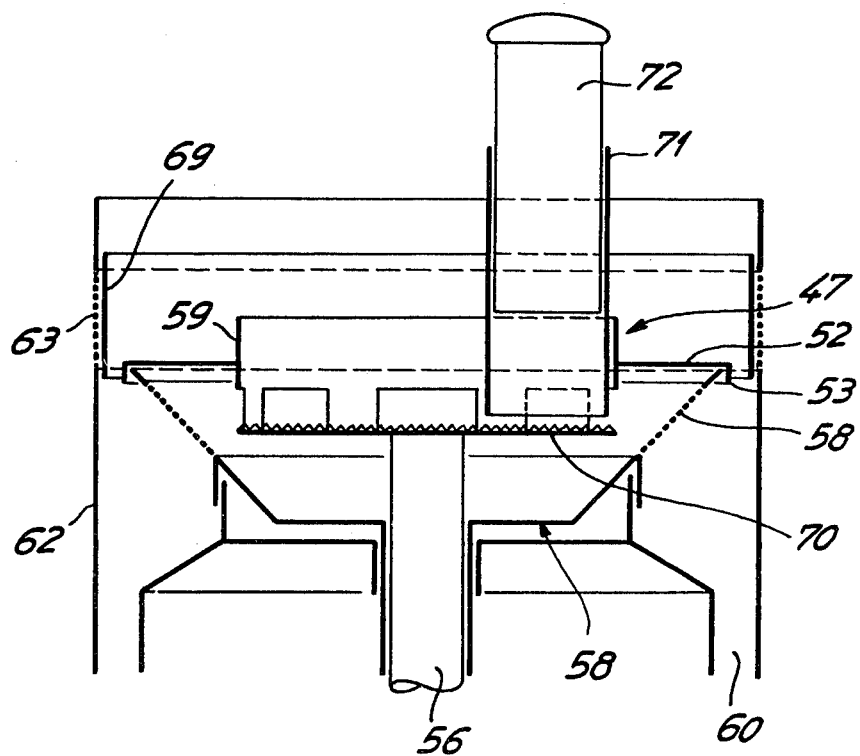
FIG. 5 is an axial section through a juice extractor centrifuge.

FIG. 5 shows a construction which is similar to FIG. 4 but which serves as a juice extractor, the distributor disc taking the form of a rasp disc 70. The bottom end of a filling tunnel 71 terminates above the radially outer peripheral region of the rasp disc 70; material for juice extraction is charged into the top of the tunnel 71 and, if necessary, forced against the disc 70 by a pusher 72.

The other components and the operation are the same as for the embodiment of FIG. 4.

We claim:

1. A centrifuge cage, more particularly for a coffee centrifuge, juice extractor or the like characterised by: a rotatable bottom member (8, 48, 58); a top member (7, 37, 47) which is releasably connected to said bottom member and is axially movable relative to said bottom member to bound a gap between itself and said bottom member; at least one mesh zone (18, 40, 50, 68) secured to at least one of said members in a radially outer zone of the periphery of said at least one member; and at least one distributor disc which corotates with the centrifuge cage and is disposed in the plane of the mesh zone.

2. A cage according to claim 1, characterised in that the top member (7, 37, 47) comprises a vessel (9) which is open at the top and whose base takes the form of a distributor disc (10) and which is formed with apertures (11) in its periphery near the base.

3. A cage according to claim 2, characterised in that the peripheral apertures (11) are contiguous with the distributor disc (10) and the same has radial ribs (14).

4. A cage according to claim 1, characterised in that the distributor disc has a rasp surface and a stationary filling tunnel extends to near such surface.

5. A cage according to claim 1, having a casing around it, characterised in that the casing (2, 62) is formed with closable apertures (63).

6. A cage according to claim 5, characterised in that an axially movable ring which engages with the apertures (63) on the inside is provided as means for closing the same.

7. A cage according to claim 1, characterised in that the bottom member (8) is disposed on a drive shaft (16).

8. A cage according to claim 7, characterised in that the drive shaft is a hollow shaft (49) and the top member (37) is disposed on a shaft (46) which is guided slidingly in the hollow shaft (49).

9. A cage according to claim 1, characterised in that a gap-bounding junction zone formed between the bottom member (8, 48, 58) and the top member (7, 37, 47) is disposed near the largest diameter of such members.

10. A cage according to claim 9, characterised in that a radially inwardly disposed sealing lip (51) is provided near the junction zone and is disposed on one of the members of the cage.

11. A cage according to claim 1, characterised in that the mesh zones (40, 50, 68) are formed in accordance with a cone generated surface.

12. A centrifuge comprising:
a rotatable centrifuge cage including:
a bottom member having a bottom and a bottom sidewall;
a top member, said top and bottom members arranged and adapted to move axially relative to one another and to releasably connect said top and bottom members at a sealing region thereof; and
a filter region in at least one of said top and bottom members adjacent said sealing region;
a distributor member mounted to said cage for rotation therewith and being generally aligned with said filter region; and
means for rotating said cage.

13. The centrifuge of claim 12 wherein said bottom sidewall tapers upwardly and outwardly.

14. The centrifuge of claim 12 wherein said distributor member includes a dished vessel mounted to the top member and having an open top, a downwardly extending circumferential sidewall and a bottom, said bottom comprising a distributor disc, said circumferential sidewall having apertures adjacent said bottom.

15. The centrifuge of claim 12 wherein said distributor member includes a distributor disc having a number of radially directed ribs.

16. The centrifuge of claim 12 wherein said rotating means includes a drive shaft mounted to the bottom of said bottom member.

17. The centrifuge of claim 12 wherein said sealing region is near the largest diameters of said top and bottom members.

* * * * *